United States Patent [19]

Costes et al.

[11] Patent Number: 4,999,769

[45] Date of Patent: Mar. 12, 1991

[54] SYSTEM WITH PLURAL CLOCKS FOR BIDIRECTIONAL INFORMATION EXCHANGE BETWEEN DMA CONTROLLER AND I/O DEVICES VIA DMA BUS

[75] Inventors: Michel Costes, Cagnes S/Mer; Alain Gach; Yves Hartmann, both of Vence; Michel Peyronnenc, St Jeannet, all of France

[73] Assignee: International Business Machines Corporation, Armonk, N.Y.

[21] Appl. No.: 197,736

[22] Filed: May 20, 1988

[30] Foreign Application Priority Data

Aug. 20, 1987 [EP] European Pat. Off. ........ 87480007.1

[51] Int. Cl.$^5$ ............................................. G06F 13/28
[52] U.S. Cl. ................................... 364/200; 364/240;
364/240.3; 364/242.3; 364/242.31; 364/270;
364/270.3; 364/221.4; 364/221
[58] Field of Search ... 364/200 MS File, 900 MS File

[56] References Cited

U.S. PATENT DOCUMENTS

| | | | |
|---|---|---|---|
| 3,336,582 | 8/1967 | Beausoleil et al. | 340/175.5 |
| 3,999,163 | 12/1976 | Levy | 364/200 |
| 4,181,934 | 1/1980 | Marenin | 364/200 |
| 4,229,791 | 10/1980 | Levy et al. | |
| 4,240,140 | 12/1980 | Stafford | 364/200 |
| 4,428,044 | 1/1984 | Liron | 364/200 |
| 4,471,427 | 9/1984 | Harris | 364/200 |
| 4,484,263 | 11/1984 | Olson | 364/200 |
| 4,494,196 | 1/1985 | Greer | 364/200 |
| 4,519,034 | 3/1985 | Smith | 364/200 |
| 4,611,279 | 9/1986 | Andreason et al. | 364/200 |
| 4,648,029 | 3/1987 | Cooper | 364/200 |
| 4,722,051 | 1/1988 | Chattopadhya | 364/200 |
| 4,807,109 | 2/1989 | Farrell | 364/200 |
| 4,809,155 | 2/1989 | Costes | 364/200 |
| 4,814,979 | 3/1989 | Neches | 364/200 |
| 4,821,170 | 4/1989 | Bernick | 364/200 |
| 4,829,445 | 5/1989 | Burney | 364/478 |
| 4,945,471 | 7/1990 | Neches | 364/200 |

FOREIGN PATENT DOCUMENTS

| | | |
|---|---|---|
| 0088982 | 9/1983 | European Pat. Off. . |
| 0175564 | 3/1986 | European Pat. Off. . |
| 0217350 | 4/1987 | European Pat. Off. . |
| 57-57330A | 6/1982 | Japan . |

OTHER PUBLICATIONS

Vol. 10, No. 380 (P-528) (2437) Dec. 19, 1986.
Vol. 6, No. 133 (P-129) (1011) Jul. 20, 1982.

Primary Examiner—David Y. Eng
Assistant Examiner—Eric Coleman
Attorney, Agent, or Firm—Edward H. Duffield

[57] ABSTRACT

An interface mechanism is described for controlling the exchange of information between two devices, such as a direct memory access controller 12 and adapter 5 through bus 10. The exchange is initiated by the adapter which activates the request line 44 and read/write signal on line 62 indicating whether a memory read or write operation is requested. The controller sends back a grant signal on line 46 when the request may be serviced. Ready line 60 is monitored and checked by the adapter and valid line 52 is monitored and checked by the controller. Turn around signal on line 64 controls the direction of the transfer on bidirectional data lines 66. A write or read operation begins with the transmission by the adapter of control parameters (address and byte count). Then for a write operation, the data burst is sent from the adapter to the controller and for a read operation the data burst is sent from the controller to the adapter. The sampling clock always travels with the parameters and data. Controller 12 transmits data with a clock 28 used by the adapter to sample that data and adapter transmits data with a clock 36 used by the controller 12 to sample that data. Clock 36 is generated by inverting clock 28. Thus the bus presents the advantages of synchronous and asychronous modes of operation. The data exchanges are synchronous, so that no time is wasted in handshaking protocols. Because of its asynchronous nature between transfers, the bus is independent of the controller data handling scheme, memory type and memory access time.

13 Claims, 10 Drawing Sheets

SYSTEM WITH PLURAL CLOCKS FOR BIDIRECTIONAL INFORMATION EXCHANGE BETWEEN DMA CONTROLLER AND I/O DEVICES VIA DMA BUS

FIELD OF THE INVENTION

This invention relates to an interface mechanism to be used in an information handling system for improving the exchange of information between two devices; more particularly it relates to an interface mechanism for improving the direct access to memory by input/output devices.

BACKGROUND OF THE INVENTION

Buses are widely used in information handling systems for exchanging information between parts of the systems. There exist two types of buses: synchronous buses and the asynchronous buses. The exchange of information through asynchronous buses is controlled by handshaking protocols which slows the thruput. In addition they require a relatively high number of wires.

The exchange of information through synchronous buses is controlled through specific data frame arrangements.

Direct memory access is a feature which is frequently used in information handling systems.

Now, for example, in an information handling system such as a communication controller the capability of connecting high speed lines through high speed line adapters such as described in European Patent Application No. 86430015.7 filed on Apr. 30,1987 is now offered. In such type of controllers, a direct memory access bus comprises the direct path which allows information to be read from and written into the memory by the line adapters in order to send or receive information from the high speed lines. For improving the operation of the communication controller, improving this path is highly desirable.

OBJECTS OF THE INVENTION

An object of the present invention is to provide an improved interface mechanism which improves the thruput of a bus used to exchange information between devices.

Another object of the present invention is to provide an improved interface mechanism which makes use of a minimum number of wires.

BRIEF SUMMARY OF THE INVENTION

The interface mechanism according to the present invention may be used for controlling the exchange of information between two devices through a bus comprising a plurality of lines. It comprises:

clock generator (32,24) located in one of said devices and providing a first clock signal on a first clock line of the bus, first clock receiver (34,38) located in the second device, for receiving the first clock signal and providing a second clock signal derived from the first clock signal on a second clock line of the bus, second clock receiver located in the first device for receiving the second clock signal, first control and sampling apparatus (22,51,200) located in the first device, which are responsive to a transfer request signal sent on a request line (44) of the bus by the second device to sent a grant signal on a grant line (46) of the bus, when the request may be serviced by the first device and which are responsive to a transfer control signal (R/W 62) sent by the second device through the bus, said signal being indicative of the direction of the transfer to cause data to be sent on data lines of the bus under control of the first clock signal when the transfer control signal indicates that the transfer is to be performed from the first device to the second device or to cause data received from the data lines of the bus to be sampled under control of the second clock signal received by the second receiving means when the transfer is to be performed from the second device to the first device, second control and sampling apparatus (9,56,54) located in the second device which are responsive to the grant signal received from the first device and to the transfer control signal to cause data to be sent to the first device through the data lines when the transfer control signal indicates that the transfer is to be performed from the second device to the first device under control of the second clock signal, and which cause data received from the first device through the data lines to be sampled under control of the first clock signal received by the first clock signal receiver when the transfer control signal indicates that the transfer is to be performed from the first device to the second device.

The interface mechanism will be described as incorporated in a system wherein the first device is a direct memory access controller and the second device is a selected input/output device, said system controlling the exchange of information between a central control unit and input/output devices through a memory which stores data bytes received from the input/output devices or which causes data bytes to be sent to the input-/output devices by means of the data lines of the bus.

The bus may comprise n data lines to carry in parallel m k-bit bytes, with n=mk. For the sake of simplicity, the detailed description of the invention will be made, assuming that m is equal 2 and k is equal to 9.

DESCRIPTION OF THE PREFERRED EMBODIMENT

Figure 1:
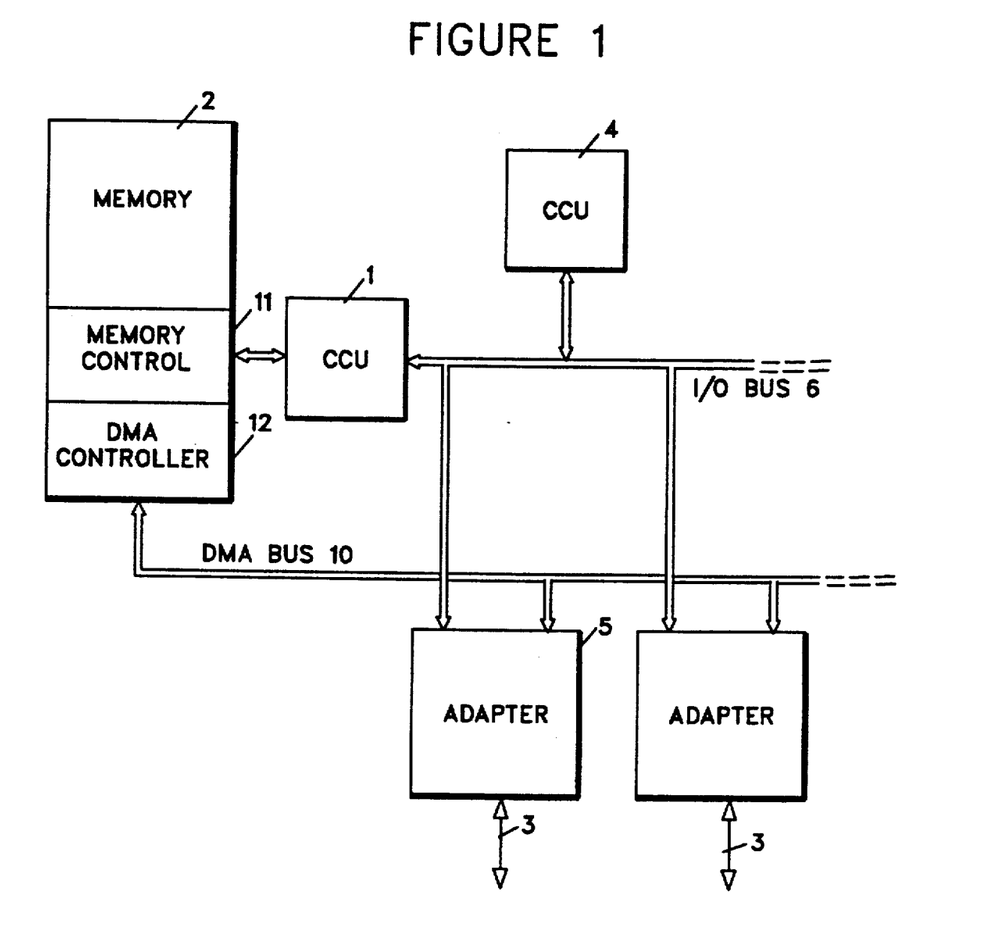
FIG. 1 shows the block diagram of a system incorporating the interface mechanism according to the invention.

As shown in FIG. 1, the communication controller which may incorporate the mechanism of the present invention, comprises a central control unit CCU 1 which operates under control of a network control program stored in memory 2. Memory 2 is also devoted to the storage of data and control information from lines 3 or from central processing unit CPU 4. The central control unit 1 controls the data exchanges between the lines 3 connected to users (i.e terminals or other communication controllers) and central processing unit 4.

Lines 3 are attached to the central control unit 1 through line adapters 5 and input/output bus 6. It is assumed that the line adapters 5 are high speed line adapters which are attached to high speed lines 3 and have direct access to the memory 2 through direct access memory DMA bus 10.

Access to memory 2 is controlled through memory control circuit 11 which may be implemented as described in European Patent Application No. 87430014.8 filed on Apr. 22, 1987.

Figure 2:
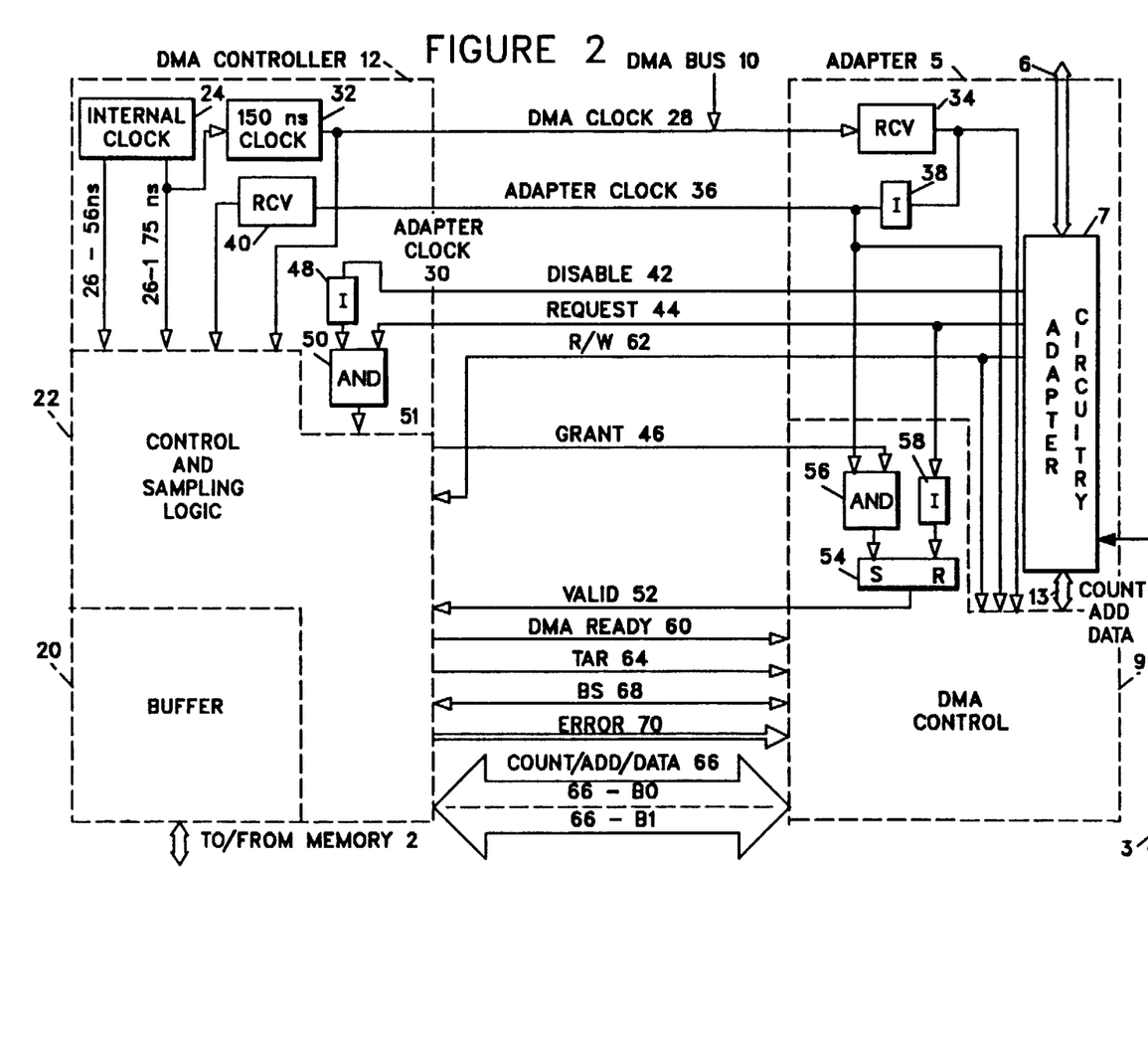
FIG. 2 shows the block diagram of the interface mechanism.

FIG. 2 schematically represents the interface according to the present invention between the direct memory access DMA controller 12 in memory control circuit 11 and the adapters. Only one adapter is represented in FIG. 2.

The DMA controller 12 controls the exchange of data on the DMA bus 10. It comprises buffering means 20 for storing the data bursts read from the memory to be transferred to a selected adapter 5 and for stating the bursts received from a selected adapter 5 t be written into the memory. The transfer of the data burst between the memory and the buffering means will not be described since it may be performed by any conventional way. The buffering means are not compulsory since the data burst may be written into or read from the memory directly. The provision of the buffering means allows the memory to be available during the data burst transfer between the adapter and DMA controller.

DMA controller 12 comprises control and sampling logic circuits 22 which works under control of internal clock signals on lines 26 and 26-1 from clock circuit 24 and DMA and adapter clock signals on lines 28 and 30.

The DMA bus works in synchronous mode so that the controller sends the synchronization clock signal provided by clock circuit 32 to all adapters attached to the bus. A selected adapter receives this clock signal from line 28 by means of receiver 34 and generates its own clock signal to sample the tags and data from/to the DMA controller 12.

The DMA controller synchro clock signal on line 28 is provided by a free running square wave clock circuit 32, the period of which is equal to the DMA bus cycle. In a preferred embodiment of the present invention, this period is equal to 150 ns.

This clock signal is synchronous with the data sent from the DMA controller. It is sent to all adapters on a common distribution line. The adapters use it to sample the data on the DMA bus and to generate their own adapter clock on line 36.

This adapter clock signal on line 36 is sent from the selected adapter to the DMA controller 12. It consists in the received synchro DMA clock signal on line 28 inverted in inverter 38 and send back to the DMA controller 12. This clock signal is received by receiver 40 in controller 12 to provide the adapter clock signal on line 30 which is used to sample the data received from the DMA bus.

Thus, the DMA controller makes use of two different clock signals on lines 28 and 30, while the adapter has only one clock system.

Adapter 5 comprises adapter circuitry 7 and DMA control circuit 9. Circuit 7 will not be described in details. It comprises the logic circuit and memory arrangement to control the transmission and reception of data from lines 3 such as described in European patent application No. 86 430015.7. The data which are received from line 3 to be written into memory are sent to fourbyte bus 13 to DMA control circuit 9. The data which are read from memory to be sent onto line 3 are sent by DMA control circuit 9 through bus 13 to adapter circuitry 7.

The disable tag on line 42 is sent by the adapter circuitry to put the DMA controller 12 in a waiting state.

A burst transfer is not interruptible, so when this disable line is activated, the DMA controller 12 terminates the operation in progress. Then, no more adapter request may be granted.

The request line 44 is activated by the adapter circuitry 7 when it requests a DMA service. All adapters requests are commonly connected on this line.

The grant line 46 is activated by the DMA controller 12 as an answer to a request. The grant line is distributed to the adapters in serial mode through a daisy chain mechanism which allows one adapter to be selected. The first requesting adapter in the chain traps the grant signal on line 46 and becomes selected.

A specific daisy chain mechanism which may be used in connection with the present invention is described in European patent application No. 86430045.4 filed on Oct. 30, 1986.

The grant signal may only be activated when the disable line is inactive. Thus, the disable signal is provided to inverter 48, the output line of which is provided to AND gate 50 together with the request line 44. The grant signal is generated from the conditional request signal at the output line of AND gate 50.

Valid line 52 is activated by the selected adapter having trapped the grant signal. The valid signal is the envelope of the data transfer between DMA controller 12 and the selected adapter. It is generated by latch 54, which is set by the active signal at the output of AND gate 56 the inputs lines of which are the grant line 46 and the T-clock line 36. It is reset by the request signal inverted by inverter 58.

DMA ready line 60 is activated by the DMA controller 12 in two ways:

First, for a DMA write operation, it is activated as soon as the DMA controller has decoded the write signal on the R/W line 62.

Second, for a DMA read operation, it is activated when the DMA controller has transferred the data burst from the memory into its buffering means and is ready to transfer it to the adapter.

The signal on read/write line 62 is sent by adapter circuitry 7. It indicates whether the operation requested by the selected adapter is a memory read or write operation.

The turn around TAR line 64 is activated by the DMA controller, when it has decoded a read signal on line 62 to allow a possible gating of the drivers/receivers on the bidirectional DMA bus data lines 66.

Byte select line BS 68 is controlled by the sending party. It is always activated during the exchange parameter and data transfer, except for the last such transfer.

It is activated during the last half-word transfer if two bytes are transferred. It is not activated if only one byte is transferred.

Three error lines 70 are used by the DMA controller 12 to report various errors to the adapter. Up to seven error types may be encoded on these error lines.

Lines 66 comprise in a preferred embodiment of the present invention, 18 bidirectional wires which carry the data half-words (two bytes) back and forth between the adapters and the memory 2 together with the parity bits.

During a transfer, the two first half-words are used to carry the exchange parameters and following half-words form the data burst.

Each half-word comprises two bytes 0 and 1, which are carried by lines 66-B0 and 66-B1, respectively.

In the first half-word which is sent by the adapter to the DMA controller, Bits 0 to 7 of byte 0 carry the least significant byte of the memory starting address from which the burst is to be read or written, depending upon the direction of the transfer.

Byte 1 carries the number of bytes of the data burst to be transferred, which will be referenced as count byte.

The second half-word sent by the adapter to the DMA controller carries the two other bytes of the memory starting address.

Thus, the bus uses the advantages of the synchronous and asynchronous modes of operation. Data transfer is synchronous, so that no time is wasted in handshaking protocols. Because of its asynchronous nature between data transfers, the bus is independent of the DMA controller internal data handling scheme, memory type and memory access time.

Figure 3:
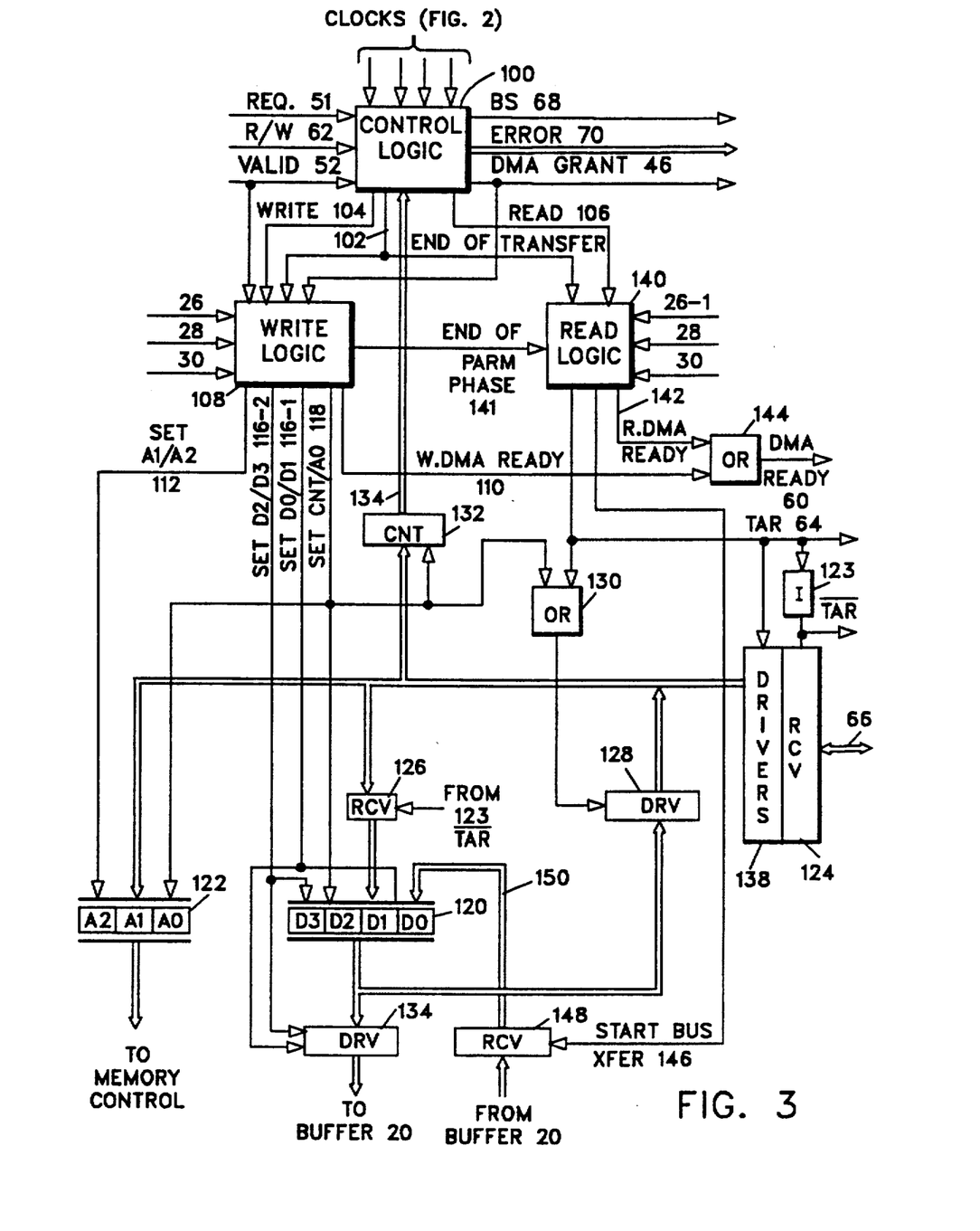
FIG. 3 shows the sampling and control logic 22 of FIG. 2.

FIG. 3 represents the control and sampling logic 22 together with the address and data registers which allow the data to be received from or sent to lines 66 from the memory through buffer 20.

This logic comprises control logic 100 which generates the grant signal on line 46 from the request signal on line 51 at the output of AND gate 50. It is responsive to the clock signals on lines 26, 26-1, 28 and 30, to the R/W signal on line 62 and to the valid signal on line 52. It also generates the DMA BS signal on line 68 during a memory read operation. It also checks the BS signal on line 68 during a memory write operation to generate an error signal on lines 70, when BS signal does not become inactive during the last transfer if the byte count is odd.

Furthermore it generates an error signal if the valid line 52 becomes inactive when the transfer of the data burst to be written into the memory is not completed.

It also generates the end of transfer signal on line 102, an active signal on line 104 when a write operation is requested and an active signal on line 106 when a read operation is requested.

WRITE control logic 108 is responsive to the clocks signals on lines 26, 28 and 30, to the write signal on line 104, to the end of transfer signal on line 102 and to the DMA grant signal on line 46, to generate the WRITE DMA ready signal on line 110, and gating signals on lines 112, 116, 118, to control the loading of the count byte of the first half-word into one byte position of the four-byte data register 120 and the address bytes into the three-byte address register 122.

TAR line 64 which is controlled by read logic 140 is set at 0 during the transfer of information from the adapter to the DMA controller and is set at 1 during the transfer from the DMA controller to the adapter. The TAR signal is inverted in inverter 123 an the inverted TAR signal is provided to receivers 124 and 126 to allow the bits from lines 66 to be stored into registers 120 and 122 under the control of gating signals on lines 112, 116 and 118. To perform a memory write operation, it is set at 0 during the whole burst transfer.

To perform a memory read operation, it is set at 0 during the transfer of the count and address bytes and then it is set to 1 to send the data bytes to bus lines 66, as will be described later on.

SET COUNT/A0 gating signal on line 118 is provided to drivers 128 through OR gate 130, which allows the count byte stored in position D2 of register 120 to be gated by signal on line 118 into count register 132. The count value is provided by bus 134 to control logic 100, wherein it is used to generate the end of transfer signal.

The signals on line 116-1 and 116-2 which are activated when the data bytes are received from the adapter are applied to drivers 134 to provide the data bytes from data register 120 to the buffer 20.

The TAR signal on line 64 is provided to drivers 138 which drive the bus lines 66 to provide the read data bytes to the adapter under control of read control logic circuit 140.

Read control logic circuit 140 is responsive to the end of parameter phase indication on line 141 from write control logic circuit 108, to the clock signals on lines 26-1, 28 and 30, to the end of transfer signal on line 102. It generates the read DMA ready signal on line 142 which is ORed by circuit 144 with the write DMA ready signal on line 110 to provide the DMA ready signal on line 60.

Circuit 140 generates a gating signal on line 146 which is provided to receivers 148 which allow the data read from buffer 20 to be provided to registers 120 through bus 150. The data register content is provided to bus lines 66 through drivers 128 under control of the TAR signal ORed with the signal on line 118 by OR circuit 130.

Figure 4:
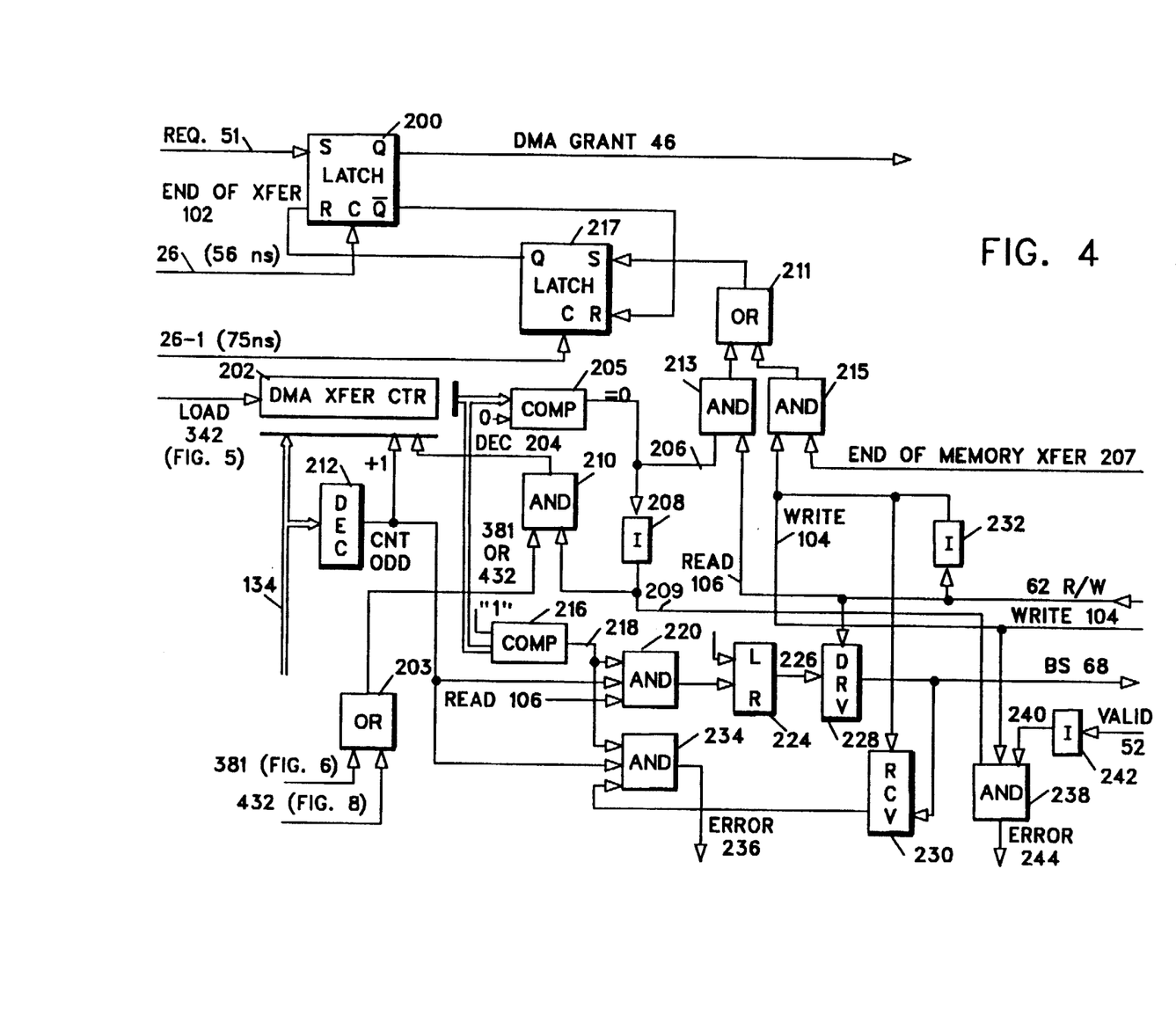
FIG. 4 shows the control logic 100 of FIG. 3.

Control logic circuit 100 is represented in FIG. 4.

It comprises a polarity hold latch 200, the set input of which is connected to the request line 51 at the output of AND gate 50. The clock input is connected to internal clock line 26 and the reset input is connected to the end of transfer line 102. Thus latch 200 provides the DMA grant signal on its output line 46 which is activated at the next clock signal following the rising edge of the request signal on line 51.

Counter 202 is loaded under control of a load signal on line 342 (FIG. 5) with the transfer number. This number is equal to the byte count divided by 2 if the count is even (least significant bit=0) and is equal to the byte count divided by 2 plus 1, if the count is odd (least significant bit=1). Thus, counter 202 is loaded with the value in register 132 provided through bus 134, which is shifted by one position to the left and incremented (or not) by one depending upon whether the byte count is odd or even.

The content of counter 202 is compared with "0" by comparator 205 which provides an active signal on its output line 206 when an equality is detected.

When a read operation is performed, the end of transfer signal is to be activated when the data burst has been sent on DMA bus 66. When a write operation is performed, the end of transfer signal is to be activated when the data burst received from the DMA bus 66 has been transferred into memory 2. This is indicated by an end of memory transfer signal provided by memory control circuit 11 on line 207.

The end of transfer signal is generated on Q output line 102 of latch 217. The clock input of latch 217 is connected to line 26-1 and its reset input is connected to the −Q output of latch 200 which resets latch 217 when grant, is no more active. Latch 217 is set by the signal on output line of OR gate 211.

Figure 9:
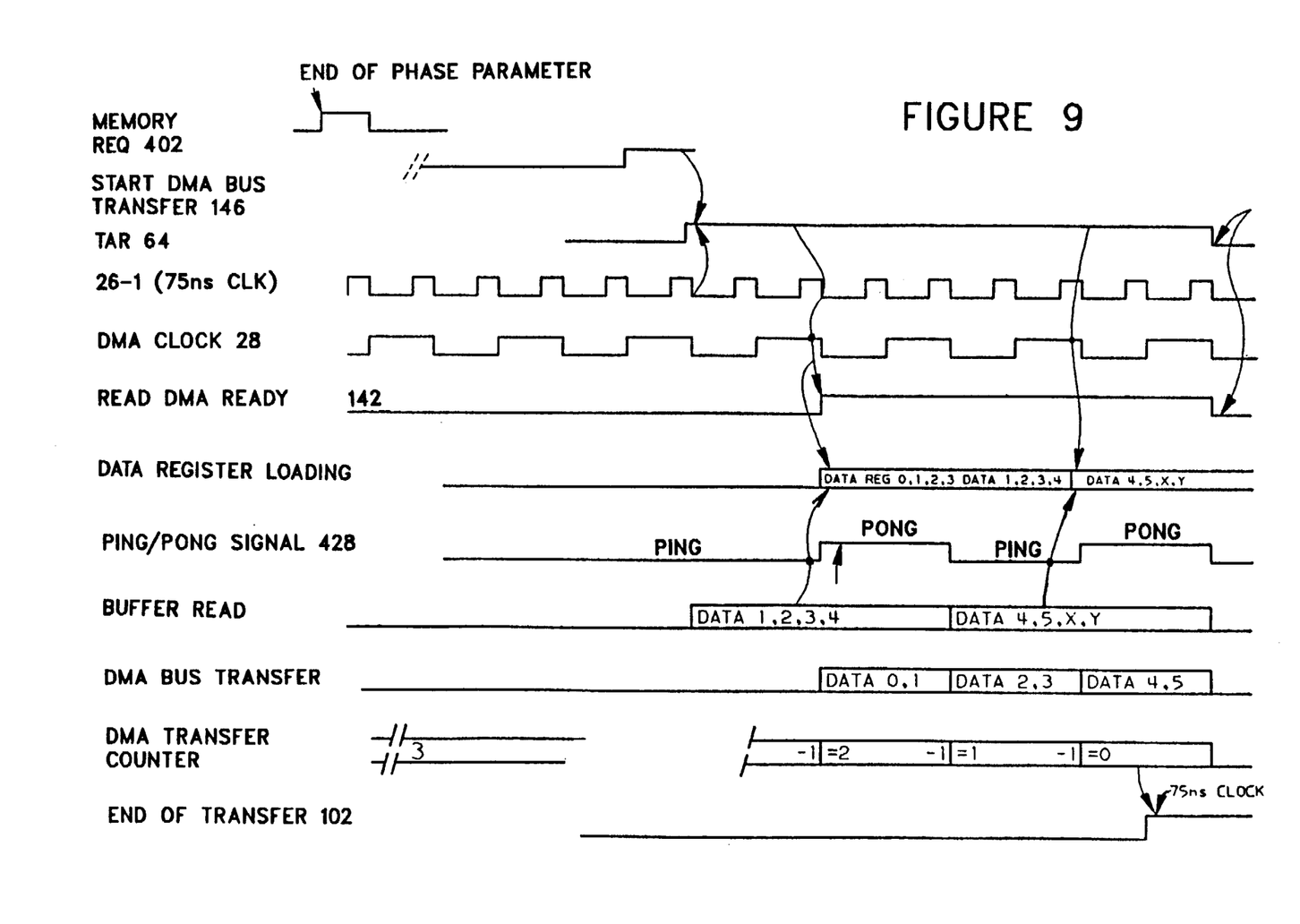
FIG. 9 shows the timing diagram of the arrangement shown in FIG. 7.

During a read operation, AND gate 213 which is conditioned by the read signal on line 106 provides an active signal when line 206 becomes active, to one input of OR gate 211, this sets latch 217 as shown in FIG. 9.

Figure 7:
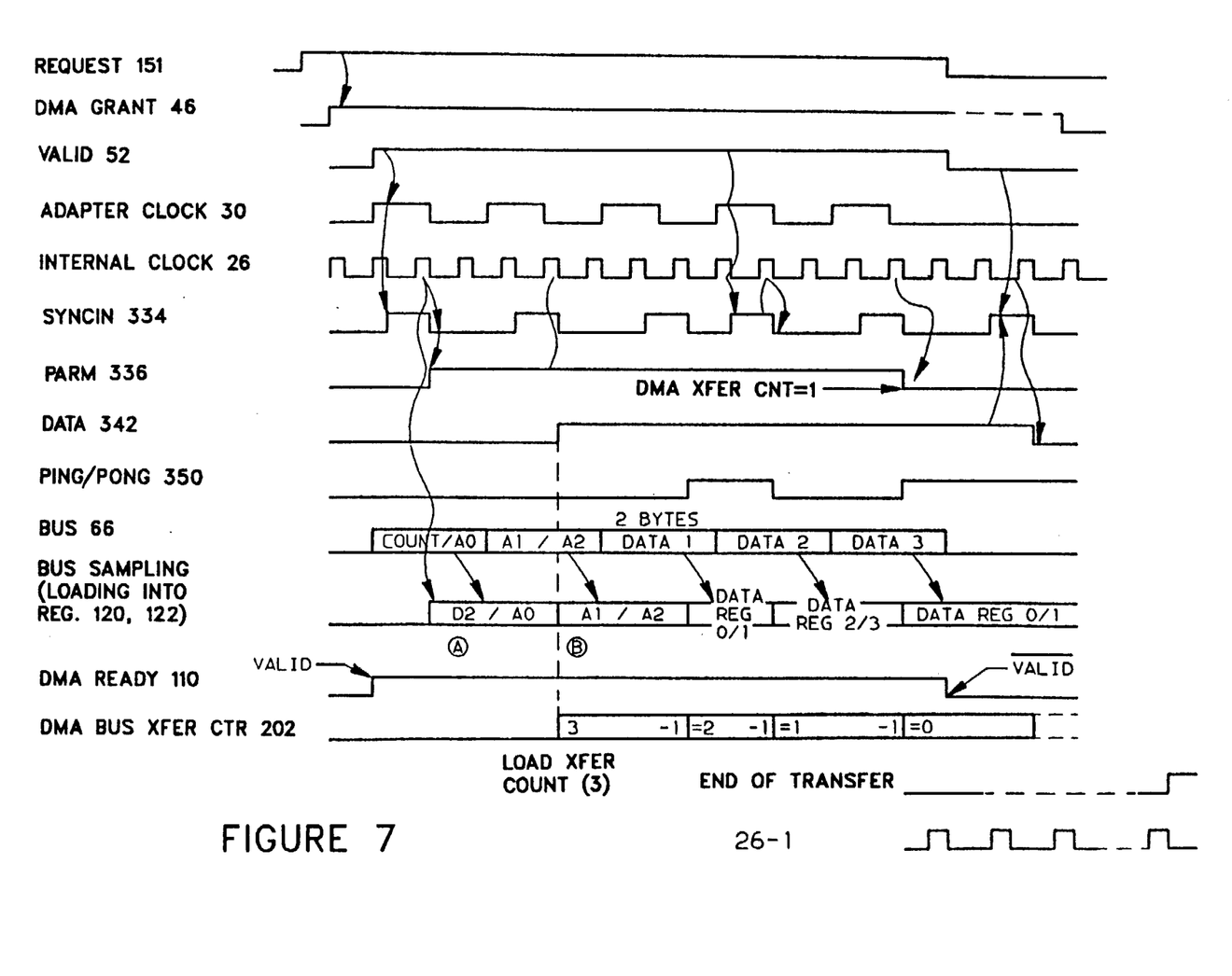
FIG. 7 shows the timing diagram of the arrangement shown in FIGS. 5 and 6.

During a write operation, AND gate 215 which is conditioned by the write signal on line 104, provides an active signal at the end of the memory transfer to the other input of OR gate 211, this sets latch 217 as shown in FIG. 7.

Figure 8:
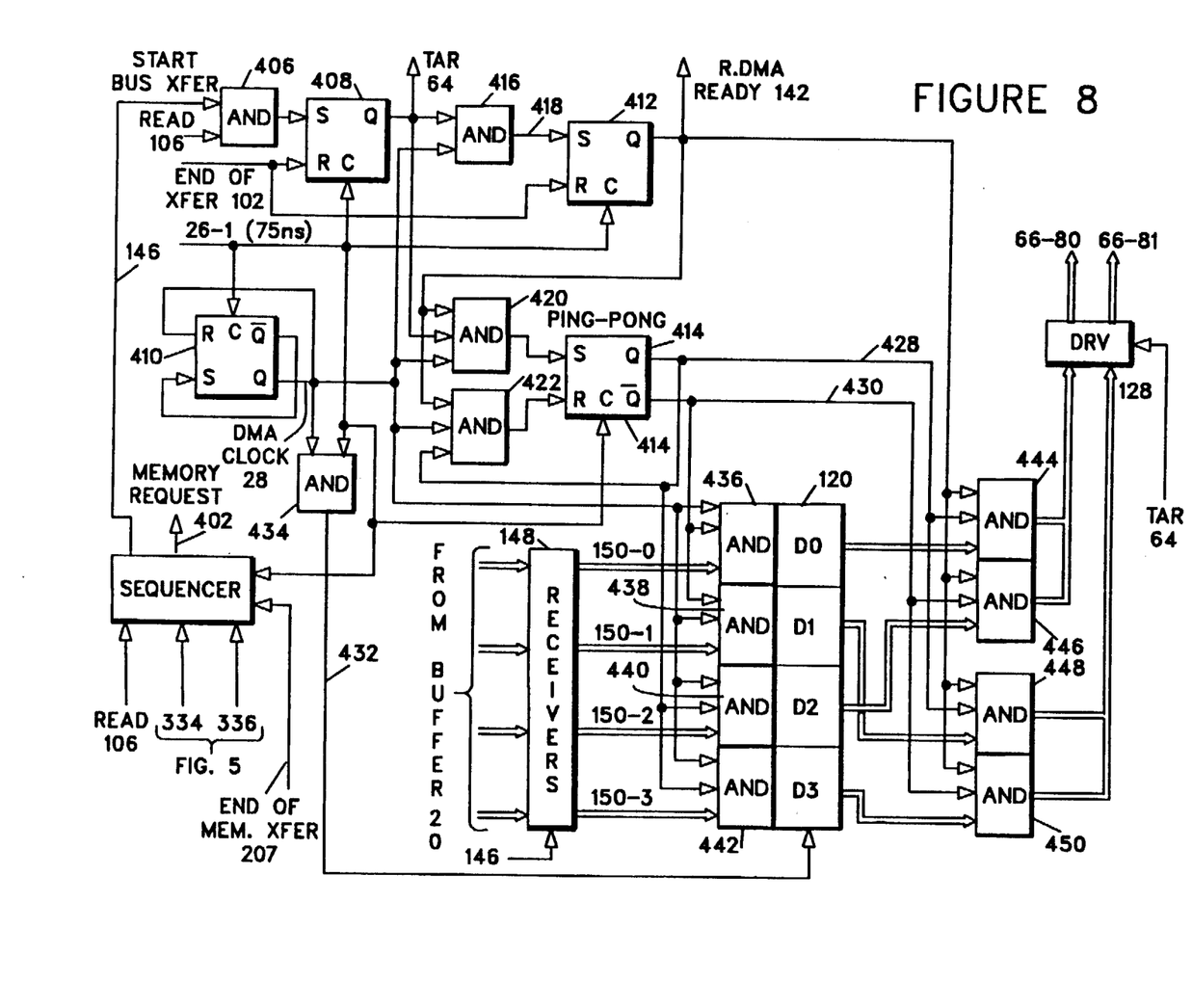
FIG. 8 shows the read control circuit 140 of FIG. 3.

Line 206 is provided to inverter 208 which thus provides an active signal when the counter content is different from 0. This signal conditions AND gate 210 which provides an active decrementing signal on line 204 each time two bytes are transferred to/from the DMA bus 66. The decrementing signal is provided by OR gate 203, the inputs of which are lines 381 (FIG. 6) and 432 (FIG. 8).

Decoder 212 receives the count value from bus 134 and provides an active signal on its output line 214 when the count value is odd, which means that the last transfer will only comprise one byte instead of two. The content of counter 202 is compared with "1" by comparator 216 which generates an active signal on its output line 218 at the beginning of the last transfer. Lines 214 and 218 are provided to AND gate 220 which is conditioned by the read signal on line 106, which is the signal received from interface line 62, in the present embodiment of the invention.

Thus, AND gate 220 provides an active signal on line 222 during the last transfer if it comprises only one byte. This signal is provided to the reset input of latch 224 which is normally set. The output line 226 of latch 224 is provided to driver 228 which is activated by the read signal on line 106 to sent the BS signal on BS line 68 when a read operation is performed.

When a write operation is performed, the BS signal is generated by a similar circuit in the adapter. This signal is received by receiver 230 activated by the write signal on line 104, which is provided by inverter 232 whose input is R/W line 62. The BS signal received from line 68 is at "1" except during the last transfer, if it comprises only one byte. The BS signal at the output of receiver 230 is provided to one input of AND gate 234. The two other inputs of AND gate 234 are connected to lines 218 and 214. Thus AND gate 234 provides an ERROR signal on its output line 236 if the BS signal is not at "0" during the last transfer of bursts comprising an odd number of bytes.

Furthermore, write line 104 at the output of inverter 232 conditions AND gate 238. The inputs of this AND gate are connected to output line 209 of inverter 208 and to the output line 240 of inverter 242 which inverts the signal on valid line 52. Thus AND gate 238 provides an error signal on its output line 244 if the valid signal falls during the transfer of the data burst from the adapter to the DMA controller.

The error signal on lines 244 and 236 which are indicative of given error conditions are coded to be sent on error lines 70. The coding means are not represented since their implementation only depends upon the error conditions which have to be reported. Only the error conditions which depends upon the DMA controller operation have been shown in the drawing.

Figure 5:
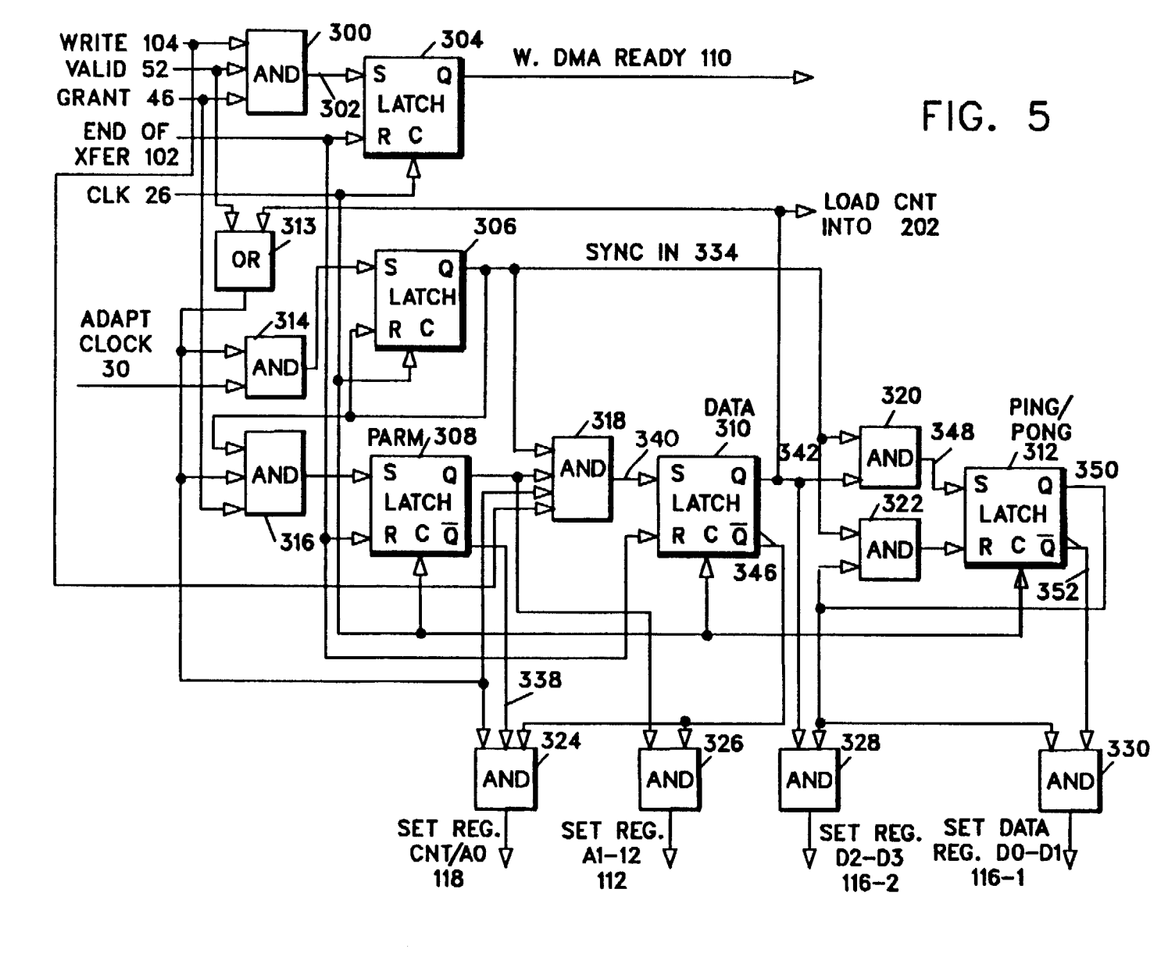
FIG. 5 shows the write control logic 108 of FIG. 3.
Figure 6:
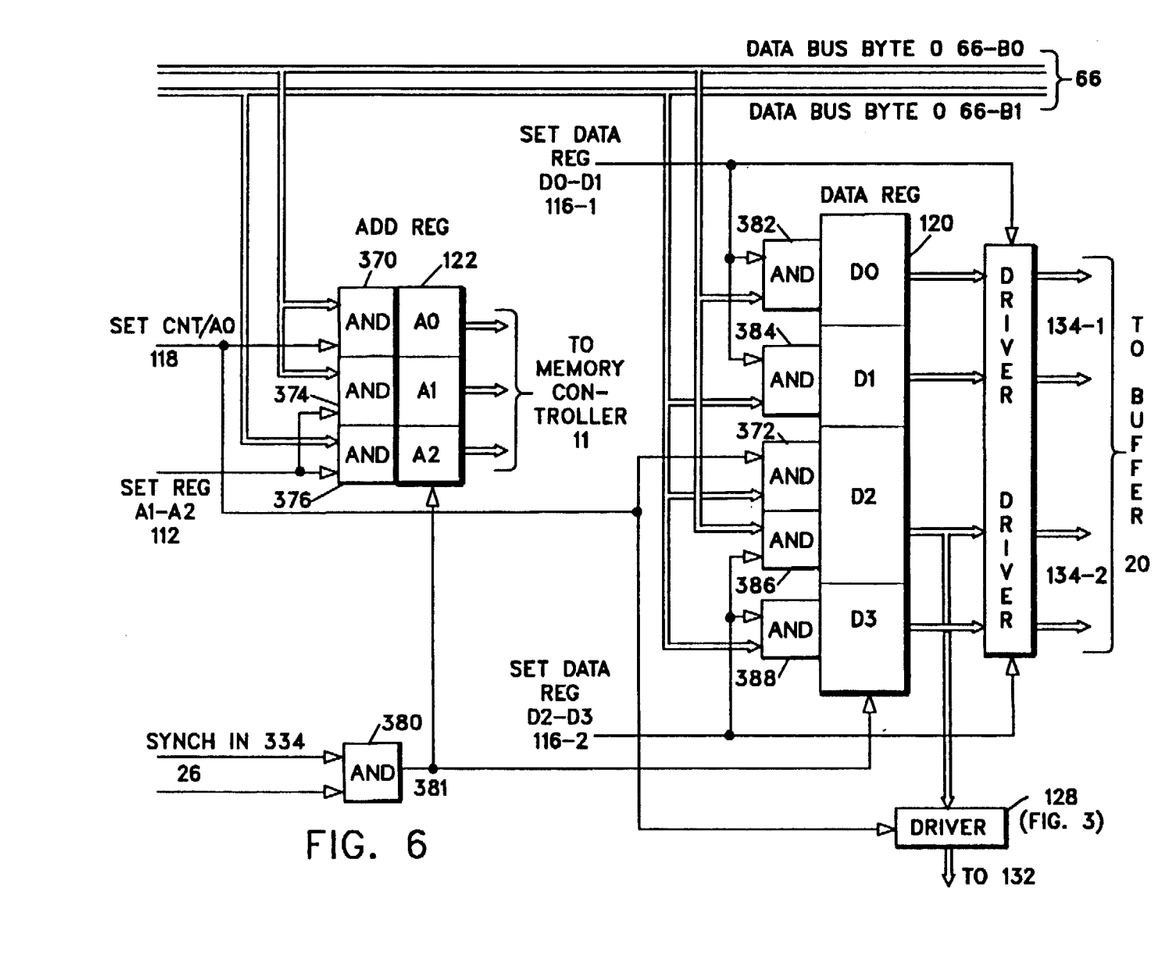
FIG. 6 shows how the address and data registers are loaded when the parameters are received from the bus and during a memory write operation.

Write control logic 108 is shown in FIG. 5 and the address and data register loading during a write operation is shown in FIG. 6. The corresponding timing diagram is shown in FIG. 7.

In FIG. 5, the inputs of AND gate 300 are connected to write line 104, valid line 52, and to grant line 46. The output line 302 of AND gate 300 is provided to the set input of polarity hold latch 304. The clock input of this latch is connected to internal clock line 26 and its reset input is connected to the end of transfer line 102. Thus, latch 304 provides the write DMA ready signal on its output line which becomes active at the next internal clock period following the rising edge of the valid signal sent by the adapter as shown in FIG. 7.

The write DMA ready signal which is received by the adapter, initiates the parameter (byte count and memory starting address) and databyte transfer without time delay between the parameter bytes and data bytes.

As can be seen on the timing diagram in FIG. 7, the successive two-byte transfers from the adapter are timed by the adapter clock signal on line 30 every 150 nanoseconds.

Two successive bytes (parameters or data) must be sampled by the DMA controller within a window which guarantees its validity. This is done by the sequencing device shown in FIG. 5 comprising latches 306, 308, 310 and 312 and AND gates 314, 316, 318, 320, 322, 324, 326, 328 and 330.

AND gate 314 is conditioned by the valid signal from line 52 which is provided to one input of gate 314 through OR gate 313. When conditioned, gate 314 provides the adapter clock signal on line 30 to the set input of latch 306 which receives the internal clock signal on its clock input. Thus, latch 306 is set on the first internal clock period following the rising edge of the adapter clock signal, (see FIG. 7). Latch 306 being ON, it is reset on the next internal clock period. This samples the two bytes which are received from the DMA bus lines 66 in the following way: the byte count is stored into data register 120-D2 and the least significant address byte A0 is stored into address register 122-A0 (see FIG. 6).

The second signal from latch 306 samples the two remaining address bytes into address register positions 122-A1 and 122-A2.

The third active signal from latch 306 begins to load the first data bytes into data register positions 120-D0 and 120-D1.

The fourth active signal from latch 306 loads the following data bytes into data register positions 120-D2 and 120-D3.

The same sequence continues until the adapter drops the valid signal after having sent the last data byte.

The circuit shown in FIG. 5 generates the gating signals on lines 112, 118, 116-1 and 116-2.

AND gate 316 is conditioned by valid and grant signals from lines 52 and 46 to provide the sync in signal on the Q-output line 334 of latch 306 to the set input of latch 308, which receives on its clock input the internal clock signal from line 26 and is reset by the end of transfer signal from line 102. PARM signal on Q-output line 336 of latch 308 is provided to AND gate 318 together with the signals from lines 334, 52 (valid) and 104 (WRITE). The output line 340 of AND gate 318 is provided to the set input of latch 310, the clock input of which is connected to internal clock line 26 and the reset input of which is connected to the end of transfer line 102.

−Q output lines 338 and 346 of latches 308 and 310 are provided to the inputs of AND gate 324 together with valid line 52. Thus AND gate 324 provides on its output line 118 the SET CNT/A0 signal which causes the count byte 120-D2 and least significant address byte to be presented at the inputs of data register position 120-D2 and of address register position 122-A0. −Q output line 346 of latch 310 is provided to one input of AND gate 326, the other input of which is connected to Q output line 336 of latch 308. Thus, AND gate 326 provides on its output line 112, the SET A1-A2 signal which causes the address bytes A1 and A2 to be presented at the inputs of address register positions 122-A1 and 122-A2.

Thus, latches 306 and 308 sequences the parameters loading. Then, the data loading is sequenced by means of AND gates 320 and 322 and latch 312 in the following way: The inputs of AND gate 320 are the SYNC IN line 334 and the Q-output line 342. The output line 348 of AND gate 320 is provided to the set input of PING-PONG latch 312. The Q output line 350 of latch 312 is provided to one input of AND gate 322 which receives on its second input the SYNC IN signal from line 334. The clock input of latch 312 is connected to the internal clock line 26. Thus, latch 312 provides the gating signal shown in FIG. 7 on its output line 350 and a complementary signal on its output line 352. Lines 352 and 342 are provided to the inputs of AND gate 330 which thus provides the SET DAT REG. D0-D1 signal on its output line 116-1.

Lines 342 and 350 are provided to the inputs of AND gate 328, which thus provides the SET DATA REG. D2-D3 signal on its output line 116-2.

The last active signal on the output of latch 306, which occurs once valid line has dropped, is generated from the active signal at the output of data latch 310 which is provided to AND gate 314 through OR gate 313.

The signal on the Q output line 342 of data latch 310, which becomes ON at the beginning of the data phase of the transfer is provided as load signal to DMA transfer counter 202 (FIG. 4).

In FIG. 7, it is assumed that the databurst comprises six bytes, so that the counter content is loaded at 3 at the beginning of the data phase and then decremented by one at each transfer.

As shown in FIG. 6 byte 0 lines 66-B0 of bus 66 and byte 1 lines 66-B1 are provided to address register 122 and to data register 120 though AND gate assemblies which are conditioned by the signals on lines 112, 118, 116-1 and 116-2.

Lines 66-B0 are provided to AND gate assemblies 370 and 372 which are conditioned by the SET CNT/A0 signal on line 118 to present the address byte A0 and byte count to the inputs of position A0 of register 122 and of position D2 of register 120.

Lines 66-B0 and 66-B1 are provided to AND gate assemblies 374 and 376 which are conditioned by the SET A1-A2 signal on line 112 to present the address bytes A1 and A2 to the inputs of positions A1 and A2 of address register 122.

The loading of registers 120 and 122 is performed by the load signal provided on line 381 by AND gate 380, the inputs of which are lines 334 and 26.

Count byte in position D2 of data register 120 is provided through driver 128 to be loaded into count register 132. Lines 66-B0 and 66-B1 are provided to AND gate assemblies 382 and 384 which are conditioned by SET DATA REG. D0-D1 on line 116-1 to present the data bytes received from these lines to the inputs of positions D0 and D1 of register 120. They are also provided to AND gate assemblies 386 and 388 which are conditioned by the SET DATA REG. D2 and D3 signal on line 116-2 to present the bytes received from these lines to the inputs of positions D2 and D3 of register 120.

The signal on the output line 381 of AND gate 380 causes the received data bytes to be loaded into register 120. They are provided to buffer 20 through drivers 134-1 and 134-2 under control of the signals on lines 116-1 and 116-2.

As shown in FIG. 7, the data loading occurs with the internal clock which resets the SYNC IN latch 306. Once two bytes are loaded into two positions of the data register 120, they are transferred to the buffer in order to free these positions.

The DMA bus sequence is completed when the adapter drops the valid line 52. The last two (or one) bytes are sampled, the buffer content is transferred to the memory and when the end of transfer line 102 becomes active, latches 200 (FIG. 4), 304, 308, 310 (FIG. 5) are reset and the DMA controller is idle, waiting for a new transfer.

The read control circuit will now be described in reference to FIGS. 8 and 9.

The read control circuit 140 controls the TAR line 64 which is set at one during the transfer of information from the DMA controller to the adapter and is set at 0 during the transfer from the adapter to the DMA controller.

The read sequence starts as the write sequence, when one adapter activates the request line 44. Control logic circuit shown in FIG. 4 sends back the grant signal on line 46, and then the parameters (count and memory starting address) are sent by the adapter to the DMA controller. These parameters are received under control of the write control circuit 108 by means of latches 306 and 308 which causes the SET CNT/A0 and SET A1-A2 signals on lines 118 and 112 to be activated. At the end of this phase, sequencer 400 which is responsive to read signal on line 106, and to the signals from lines 336 and 342 (FIG. 5), provides a MEMORY REQUEST signal on line 402.

The memory is accessed from the memory starting address which is provided by the address register 120 and the data burst comprising the number of bytes determined by the byte count is transferred into buffer 20. This transfer is not described in detail.

When the complete burst is stored into buffer 20, memory control circuit 11 (FIG. 1) provides an end of memory transfer signal on line 207, which is provided to sequencer 400. Sequencer 400 generates a start DMA bus transfer signal on line 146. As shown in FIG. 3, this signal causes receivers 148 to be activated, so that the data bytes read from buffer 20 may be provided to data register 120 through bus 150.

The read signal 106 is provided to AND gate 406 together with the start bus transfer signal 146, which thus sets latch 408.

75 ns clock signal on line 26-1 is provided to the clock input of latch 408, the reset input of which is connected to the end of transfer line 102.

Latch 408 provides the TAR signal on its output line 64, which causes the drivers 128 and 138 (FIG. 3) to be activated so that the data may be transferred from data registers 120 to DMA bus 66 under control of a sequencer comprising latches 410, 412 and 414 and their control logic circuit.

Latch 410 generates the DMA clock signal on line 28 from the 75 ns clock signal which is provided on line 26-1. Line 26-1 is connected to the clock input of latch 410, the inputs and outputs of which are cross-coupled to provide the 150 ns DMA clock on the Q-output line 28.

TAR signal on line 64 and the DMA clock on line 28 are provided to the inputs of AND gate 416. The output line 418 of AND gate 416 is provided to the set input of latch 412, the reset input of which is connected to the end of transfer line 102 and the clock input of which is connected to line 26-1. Thus, latch 412 provides the read DMA ready signal as shown in FIG. 9, on its Q-output line 142.

AND gates 420 and 422 are conditioned by the read DMA ready signal on line 142 and by the TAR signal on line 64.

AND gate 420 has three input lines, the first one is connected to line 142, the second one is connected to line 64 and the third one is connected to line 28, its output line is connected to the set input of latch 414. AND gate 422 has three input lines, the first one is connected to line 142, the second one is connected to line 28 and the third one is connected to the Q-output line 428 of latch 414. The output line of AND gate 422 is connected to the reset input of latch 414. Clock input of latch 414 is connected to line 26-1.

Thus, latch 414 provides on output line 428 the PING/PONG signal shown in FIG. 9.

The four bytes which are received each time a buffer position is read are provided through receiver 148 on buses 150-0, 150-1, 150-2 and 150-3 to be stored into D0, D1, D2 and D3 positions of data register 120.

The loading of register is controlled by signal on line 432 which is provided by AND gate 434. The inputs of AND gate 434 are lines 28 and 26-1, so that only the two bytes which are presented to the register may be loaded within the 150 clock period.

The gating of bus 150 into register 120 is controlled by four AND gate assemblies. 436, 438, 440 and 442. One input of these AND gate assemblies is connected to the clock line 28.

The second input of AND gate assemblies 436 and 438 are connected to line 430 to present the bytes provided on buses 150-0 and 150-1 to the inputs of positions D0 and D1 of register 120.

The second input of AND gate assemblies 440 and 442 are connected to line 428 to present the bytes provided on buses 150-2 and 150-3 to the inputs of positions D2 and D3 of register 120.

The load signal on line 432 causes the bytes provided to the inputs of register 120 to be loaded into the data register, as shown in FIG. 9.

AND gate assemblies 444, 446, 448 and 450 which are conditioned by the read DMA ready signal on line 142 allow the content of positions D0, D1, D2 and D3 of registers 120 to be transferred to data lines 66-B0 and 66-B1 through drivers 128 at the right times.

The bytes from D0 and D1 are transferred through AND gate assemblies 444 and 448 under control of the signal on line 428, to the inputs of drivers 128 to be sent onto lines 66-B0 and 66-B1, when signal on line 428 becomes active.

The bytes from D2 and D3 are transferred through AND gate assemblies 446 and 450 under control of signal on line 430 (which is the complement of signal on line 428) to the inputs of drivers 138 to be sent onto lines 66-B0 and 66-B1 when signal on line 430 becomes active.

The timing of these operations is clearly shown in FIG. 9.

The DMA transfer counter is decremented by one each time line 432 becomes active transfer onto the DMA bus lines 66 occurs. Each transfer of two bytes lasts 150 ns. The end of transfer phase begins when counter 202 reaches 0.

As the last data transfer must also last 150 ns, the transfer stops 75 ns later when latches 412, 200, 308 are reset.

The last buffer transfer loaded four bytes into the data register which are referenced 4,5,X,Y in FIG. 9, whereas only two bytes are significant (it is assumed that the byte count is equal to six). The two remaining bytes X and Y are cleared during the next write or read sequence.

The DMA bus is thus free to process a new adapter request.

Figure 10:
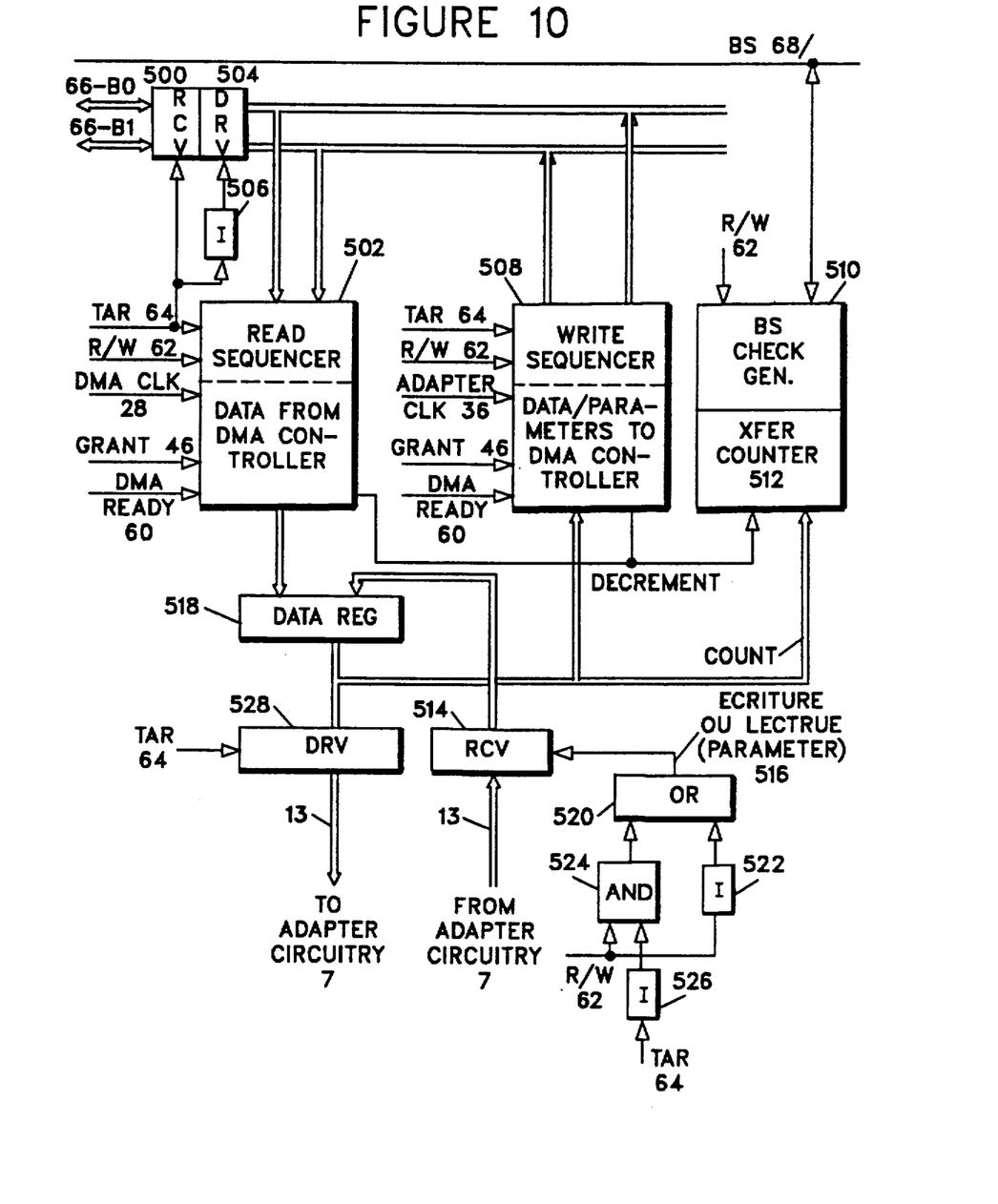
FIG. 10 shows the DMA control logic 9 of FIG. 2.

FIG. 10 shows the part of the DMA control circuit 9 in the adapter which allows the count and address bytes and data bytes to be sent from the adapter on the DMA bus lines 66-B0 and 66-B1 and the data bytes to be received by the adapter through the DMA bus lines 66-B0 and 66-B1.

Receivers 500 which are activated by the TAR signal on line 64 receive the data bytes which are read from the memory 2 and provided on bus line 66-B0 and 66-B1 by the DMA controller 12. These bytes are provided under control of read sequencer circuit 502 to the adapter circuitry to be sent onto the communication line 3.

Driver 504 are activated by the inverted TAR signal provided by inverter 506 to provide the count and address bytes which have to be sent by the adapter circuitry 7 for a read or write operation and the data bytes which have to be sent from the communication line 3 to bus lines 66-B0 and 66-B1 for a memory write operation under control of write sequencer circuit 508.

BS checking and generating circuit 510 is operative during a read operation to check the BS line 68 and during a write operation to generate the signal on the BS line 68, as described before.

Circuit 510 comprises a transfer counter 512 which is decremented each time two bytes are received or sent from/to bus lines 66 under control of circuits 502 and 508. It comprises means which are similar to the means which interfaces the BS line 68 in DMA controller 12 and which are shown in FIG. 4, they only differ in that the BS line is activated by circuit 510 for a write operation and checked for a read operation.

Adapter circuitry 7 sends the count and address bytes relative to a write or read operation through bus 13, . These bytes are provided through receivers 514, which are activated by a signal on line 516, to data register 518. These bytes are provided by circuit 508 which is responsive to the grant signal on line 46, to bus lines 66-B0 and 66-B1 under the control of adapter clock on line 36.

Line 516 is activated during the parameter sending period of a read operation and during the complete write transfers. Thus, line 516 is the output line of OR circuit 520, the inputs of which are provided by inverter 522 which inverts the R/W signal on line 62 and by AND gate 524. AND gate 524 provides an active signal, when R/W signal on line 62 is at "1" (read operation) and when the inverted TAR signal provided by inverter 526 is at "1".

Read and write sequencer circuits 502 and 508 are responsive to the R/W signal on line 62, TAR signal on line 64, and DMA ready signal on line 60 and operates under the control of the DMA clock signal on line 28 and adapter clock signal on line 36, respectively.

To perform a write operation, when the DMA ready signal becomes active, write sequencer circuit 508 provides the data bytes from adapter circuitry 7 received by receivers 514 and data register 518 on bus lines 66-B0 and 66-B1 at the adapter clock rate.

To perform a read operation, read sequencer circuit 502 is responsive to the DMA ready signal on line 60 to provide the data bytes received from bus 66-B0 and 66-B1 the adapter circuitry 7, through data register 51B and drivers 528 which are activated by the TAR signal on line 64.

We claim:

1. An interface mechanism for controlling the exchange of information between first and second devices through a bus comprising a plurality of lines, characterized in that said interface mechanism comprises:
   in the first device, first clock generating means (32,34) providing a first clock signal and sending it to the second device through a first clock line of the bus,
   in the second device, first clock signal receiving means (34,38) connected to said first clock line for receiving the first clock signal and deriving a second clock signal therefrom, and sending it to the first device through a second line of the bus,
   in the first device, second clock receiving means connected to said second line for receiving the second clock signal,
   in the first device, first control and sampling means (22,51,200) which are responsive to a transfer request signal sent on a request line (44) of the bus by the second device to send a grant signal on a grant line (46) of the bus, when the request may be serviced by the first device and which are responsive to a transfer control signal (R/W 62) sent by the second device through the bus, said signal being indicative of the direction of the transfer to send data on data lines of the bus under control of the first clock signal when the transfer control signal indicates that the transfer is to be performed from the first device to the second device or to sample data received from the data lines of the bus under control of the second clock signal received by the second receiving means when the transfer is to be performed from the second device to the first device,
   in the second device, second control and sampling means (9,56,54) which are responsive to the grant signal received from the first control and sampling means and to the transfer control signal to send data to the first device through the data lines under control of the second clock signal when the transfer control signal indicates that the transfer is to be performed from the second device to the first device and sample the data received from the first device through the data lines under control of the first clock signal received by the first clock signal receiving means when the transfer control signal indicates that the transfer is to be performed from the first device to the second device, wherein said bus comprises n data bidirectional lines to carry in parallel m k-bit bytes with n=mk,
   and in which the first and second clock signals have the same period and are out of phase,
   wherein the first device is a direct memory access controller (12) in a system which controls the exchange of information between a central unit and input/output devices (3) through memory means (2,11) which stores data k-bit bytes received from the input/output devices through the data lines of the bus (10) and the second device is a selected one of the input/output devices, characterized in that:
   the second control and sampling means comprises:
      bus driving means (504)
      bus receiving means (500)
      parameter generating means (508,504) which are responsive to the grant signal for initiating the sending of transfer control parameter bytes through the data lines under control of the second clock signal, said parameter bytes comprising at least one count byte indicative of the count of bytes in the data burst to be transferred and at least one address byte indicative of the starting address in the memory means where the burst to be transferred to the second device is stored or where the burst received by the first device is to be stored, and
   the first control and sampling means comprises:
      bus driving means (138)
      bus receiving means (124)
      data register means (120)
      address register means (122)
      means (306,308,324,122,120) for sampling and loading the count byte(s) into the data register means and the address byte(s) into the address register means under control of the second clock signal, so as to use them to control the subsequent data bytes transfer;
      means (406,408) for generating a turn around signal on a turn around line (64) of the bus, when the data transfer may be initiated so as to activate the bus receiving or driving means in such a way that the data may be received from the bus or sent to the bus depending upon said transfer control signal, the turn around signal being sent to the second sampling and control means to activate the bus receiving or driving means in the said second sampling means depending upon said transfer control signal.

2. Interface mechanism according to claim 1 characterized in that the first sampling and control means comprise:
   transfer control means (100) which are responsive to the request signal and to the count byte(s) to control the grant line during the transfer operation and generate an end of transfer signal when the transfer is completed,
   write control means (108) which are responsive to the transfer signal indicative of a write transfer from the I/O device to sample the data byte following the parameters, received from the data lines and provide said data bytes to the data register means to be inputted to the memory means,
   read control means (140) which are responsive to the transfer control signal indicative of a read transfer from the direct memory access controller to cause the data bytes read from the memory means to be sent to the I/O device once the parameter sending phase is completed.

3. Interface mechanism according to claim 2 characterized in that the transfer control means comprises:
   end of transfer signal generating means which comprises:

bus transfer counting means (202) which are loaded with the count byte(s) from the data register means and then decremented each time m bytes are sent to the bus, end of transfer detecting means (205) responsive to the bus transfer counting means content for providing an active signal when said content becomes equal to 0, means (217) which are responsive to the memory means providing an end of memory transfer signal when the data byte burst received from the bus are written into the memory and to the active signal provided by the end of transfer detecting means to generate the end of transfer signal, grant signal generating means which are responsive to the request and to the end of transfer signals to activate the grant line during the data burst transfer.

4. Interface mechanism according to claim 1 or 2 or 3 characterized in that the clocking means located in the memory access controller comprise and internal clock means generating a first internal clock signal (26), the period of which is lower than the half of the period of the first clock signal and a second internal clock signal (26-1), the period of which is equal to the half of the period of the first clock signal.

5. Interface mechanism according to claim 4, characterized in that the grant signal generating means comprise a polarity hold latch (200) which is set on the next pulse of the first internal clock signal following the activation of the request line and is reset by the end of transfer signal so as to provide the grant signal on its output line.

6. Interface mechanism according to claim 2 or 3 characterized in that the second control and sampling means comprise means (54,56,58) for generating a validation signal on a valid line (52) of the bus which is activated from the first occurrence of a pulse of the second clock signal following the activation of the grant line until the activation of the end of transfer signal.

7. Interface mechanism according to claim 6 characterized in that the write control means comprises:
a polarity hold latch (304) which is set when the transfer control signal is indicative of a write transfer from the input/output device and when the valid and grant lines are activated, on the first pulse of the first internal clock and which is reset by the end of transfer signal for generating a ready signal on its output line, which is sent on a ready line (60) of the bus, to indicate that the direct memory access controller is ready to receive the data byte burst.

8. Interface mechanism according to claim 7 characterized in that the means for sampling and receiving the control parameters are located in the write control means which comprises:
sequencing means (306,308,310,312,380) which are active when the valid and grant lines are activated and responsive to the first internal clock signal and to the second clock signal to generate conditioning signals which cause the address bytes of the parameters to be loaded into the address register means, the burst length bytes to be loaded into the transfer counting means and then the data bytes to be loaded into the data register means to be inputted to the memory means.

9. Interface mechanism according to claim 5 or 6, characterized in that the read control means comprises:
means (400) which are responsive to the transfer control signal indicative of a read transfer from the direct memory access controller and active when the parameters have been received to generate a start bus transfer signal which initiates the sending of the data bytes from the direct memory access controller onto the data lines of the bus, means (406,408) which are responsive to the start bus transfer signal for setting the turn around signal on the turn around line of the bus to a value which causes the bus driving means to be activated in such a way that the data bytes read from the memory may be sent on the data lines, latching means (412) which are responsive to the turn around signal for activating the read line (60) during the data transfer from the direct memory access controller onto the bus data lines.

sequencing means (414) for providing the data bytes from the memory onto the bus data lines through the data register under control of the first clock signal.

10. Interface mechanism according to claim 3, characterized in that the bus comprises a byte select line (68) which is controlled by the sending device in such a way that it is active during the successive transfers of the m bytes of the data burst except the last one if it comprises less than m bytes.

11. Interface mechanism according to claim 10 characterized in that the bus comprises error lines (70) which are activated by the direct memory access controller when error conditions have to be reported to the Input/Output device.

12. Interface mechanism according to claim 11 characterized in that the first control and sampling means comprises:
means (216, 234, 230) which are responsive to the byte select line (68) during a write transfer of data burst and to the byte counting means content to generate an error signal when the byte select line is not deactivated during the last transfer when said transfer comprises less than m bytes.

13. Interface mechanism according to claim 12 characterized in that the first control and sampling means comprises:
means (238, 242) which are active during a write transfer to generate an error signal, and responsive signal on the valid line to generate an error signal if said line becomes inactive during the transfer.

* * * * *